(12) United States Patent
Cunico et al.

(10) Patent No.: US 9,942,389 B2
(45) Date of Patent: Apr. 10, 2018

(54) INDICATING THE CURRENT DEMEANOR OF A CALLED USER TO A CALLING USER

(71) Applicant: International Business Machines Corporation, Armonk, NY (US)

(72) Inventors: Hernan A. Cunico, Holly Springs, NC (US); Jonathan Dunne, Dungarvan (IE); Jeremiah O'Connor, Roscommon (IE); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 14/805,874

(22) Filed: Jul. 22, 2015

(65) Prior Publication Data

US 2017/0026511 A1    Jan. 26, 2017

(51) Int. Cl.
*H04M 3/42* (2006.01)
*H04W 4/12* (2009.01)

(52) U.S. Cl.
CPC ... *H04M 3/42017* (2013.01); *H04M 3/42093* (2013.01); *H04M 3/42382* (2013.01); *H04W 4/12* (2013.01)

(58) Field of Classification Search
CPC ......... H04M 3/42093; H04M 3/42085; H04M 3/42102; H04M 3/42017; H04M 3/42068;
(Continued)

(56) References Cited

U.S. PATENT DOCUMENTS 7,069,018 B1 *  6/2006  Granstam ............. H04M 1/663
                                                      455/414.1
8,036,361 B2   10/2011  Batni et al.
(Continued)

FOREIGN PATENT DOCUMENTS

WO       2014092919 A1    6/2014

OTHER PUBLICATIONS

Ray, B., "Custom Ring Back Tones: Coming to Your Next Contract Mobe?" [online] The Register, Oct. 14, 2013 [retrieved May 6, 2015], Retrieved from the Internet: <http://www.theregister.co.uk/2013/10/14/is_the_time_really_right_for_ring_back_tones/>, 4 pg.
(Continued)

*Primary Examiner* — George Eng
*Assistant Examiner* — Umair Ahsan
(74) *Attorney, Agent, or Firm* — Cuenot, Forsythe & Kim, LLC (57) ABSTRACT

At least one user expression of a first user of a first communication device, at least one text-based electronic communication sent or received by the first user, or at least one background sound detected in an environment where the first user is located can be monitored in real time. A current demeanor of the first user can be automatically determined by processing user expression, the text-based electronic communication, or the background sound. An incoming call from a second communication device to the first communication device can be detected. Responsive to detecting the incoming call, a ringback tone indicating the current demeanor of the first user can be automatically selected. The ringback tone can be communicated to the second communication device for presentation to a second user who is using the second communication device.

18 Claims, 4 Drawing Sheets

(58) Field of Classification Search
CPC .......... H04M 3/42059; H04M 3/4211; H04M 3/42365
See application file for complete search history.

(56) References Cited

U.S. PATENT DOCUMENTS

| | | | | |
|---|---|---|---|---|
| 8,126,126 | B2* | 2/2012 | Haley | H04M 3/42017 379/201.01 |
| 8,515,396 | B2 | 8/2013 | Qi et al. | |
| 8,965,828 | B2 | 2/2015 | Greenzeiger et al. | |
| 2006/0147021 | A1* | 7/2006 | Batni | H04M 3/42017 379/221.08 |
| 2006/0182247 | A1* | 8/2006 | Batni | H04M 3/42017 379/189 |
| 2008/0095326 | A1* | 4/2008 | Qi | H04M 3/42017 379/67.1 |
| 2008/0108334 | A1* | 5/2008 | Wang | H04M 3/42017 455/414.1 |
| 2011/0014932 | A1* | 1/2011 | Estevez | G01S 19/14 455/466 |
| 2014/0025620 | A1* | 1/2014 | Greenzeiger | G06F 17/30702 706/47 |
| 2016/0004397 | A1* | 1/2016 | Kim | G06F 15/0291 715/203 |

OTHER PUBLICATIONS

"Tag Archives: iPhone App Mood," [online] DevJockeys, iOS and Android Development, Aug. 2, 2013 [retrieved May 6, 2015], Retrieved from the Internet: <https://devjockeys.wordpress.com/tag/iphone-app-mood/>, 2 pg.

"Ringback Tone," [online] Wikipedia, the Free Encyclopedia, May 5, 2015 [retrieved May 6, 2015], Retrieved from the Internet: <http://en.wikipedia.org/w/index.php?title=Ringback_tone &oldid=660993706>, 5 pg.

"How to Change Dialtone Sound in Android and iOS," [online] Stack Overflow, Sep. 2, 2014 [retrieved May 6, 2015], Retrieved from the Internet: <http://stackoverflow.com/questions/25614838/how-to-change-dialtone-sound-in-android-an . . . >, 1 pg.

"Personalized Ringback Tone Service," [online] Syniverse Technologies, LLC © 2015 [retrieved Jul. 21, 2015] Retrieved from the Internet: <http://www.syniverse.com/Personalized-Ringback-Tone-Service>, 1 pg.

"Ringtones and Ringback Tones," [online] Verizon Wireless © 2015 [retrieved May 6, 2015] Retrieved from the Internet: <http://www.verizonwireless.com/support/ringback-tones/>, 2 pg.

Wolf, G., "Measuring Mood N Current Research and New Ideas," [online] Quantified Self Labs © 2012 [retrieved Jul. 21, 2015] Retrieved from the Internet: <http://quantifiedself.com/2009/02/measuring-mood-current-resea/>, 8 pgs.

* cited by examiner

FIG. 5

INDICATING THE CURRENT DEMEANOR OF A CALLED USER TO A CALLING USER

BACKGROUND

The present invention relates to communications, and more specifically, to audio and/or video calls.

As a society people are communicating among each other more than ever before. The phenomenal growth in such communication is due, in large part, to the mass usage of smart phones, tablet computers and miscellaneous smart devices. One real-time form of communication is voice communication, which may take place using a traditional handset or through a multitude of voice over Internet protocol (VoIP) offerings that are currently available.

SUMMARY

A method includes monitoring, in real time, at least one user expression of a first user of a first communication device, at least one text-based electronic communication sent or received by the first user, or at least one background sound detected in an environment where the first user is located. The method also includes automatically determining a current demeanor of the first user by processing, using a processor, the at least one user expression of the first user, the at least one text-based electronic communication sent or received by the first user, or the at least one background sound in the environment where the first user is located. The method also includes detecting an incoming call from a second communication device to the first communication device. The method also includes, responsive to detecting the incoming call from the second communication device to the first communication device, automatically selecting a ringback tone indicating the current demeanor of the first user. The method also includes communicating the ringback tone indicating the current demeanor of the first user to the second communication device for presentation to a second user who is using the second communication device.

A system includes a processor programmed to initiate executable operations. The executable operations include monitoring, in real time, at least one user expression of a first user of a first communication device, at least one text-based electronic communication sent or received by the first user, or the at least one background sound in the environment where the first user is located. The executable operations also include automatically determining a current demeanor of the first user by processing the at least one user expression of the first user, the at least one text-based electronic communication sent or received by the first user, or the at least one background sound in the environment where the first user is located. The executable operations also include detecting an incoming call from a second communication device to the first communication device. The executable operations also include, responsive to detecting the incoming call from the second communication device to the first communication device, automatically selecting a ringback tone indicating the current demeanor of the first user. The executable operations also include communicating the ringback tone indicating the current demeanor of the first user to the second communication device for presentation to a second user who is using the second communication device.

A computer program includes a computer readable storage medium having program code stored thereon. The program code is executable by a processor to perform a method. The method includes monitoring, by the processor, in real time, at least one user expression of a first user of a first communication device, at least one text-based electronic communication sent or received by the first user, or at least one background sound detected in an environment where the first user is located. The method also includes automatically determining, by the processor, a current demeanor of the first user by processing, using a processor, the at least one user expression of the first user, the at least one text-based electronic communication sent or received by the first user, or the at least one background sound in the environment where the first user is located. The method also includes detecting, by the processor, an incoming call from a second communication device to the first communication device. The method also includes, responsive to detecting the incoming call from the second communication device to the first communication device, automatically selecting, by the processor, a ringback tone indicating the current demeanor of the first user. The method also includes communicating, by the processor, the ringback tone indicating the current demeanor of the first user to the second communication device for presentation to a second user who is using the second communication device.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to communications, and more specifically, to audio and/or video calls. In accordance with the inventive arrangements disclosed herein, a processing system can monitor, in real time, one or more user expressions of a user, one or more text-based electronic communications sent by the user and/or one or more background sounds detected in an environment where the user is located. In one arrangement, the processing system can be the user's communication device. In another arrangement, the processing system can be another system communicatively linked to the user's communication device (e.g., a computer, server, telephone system or the like).

The processing system can process the user expression(s), text-based communication(s) and/or the background sound(s) and, based on such processing, automatically determine a current demeanor of the user. The process can be a continual process. Accordingly, the determined current demeanor can change as data for additional user expression(s), text-based communication(s) and/or the background sound(s) continues to be gathered. Thus, as the user's demeanor changes, the determination of the current demeanor of the user can automatically change.

At some point another user may place a call to the first user. For example, a second user may use his/her communication device to initiate a voice or video call routed to the first user's communication device. Responsive to detecting the call, but prior to the first user answering the call, the processing system can automatically select a ringback tone indicating the current demeanor of the first user, and communicate the ringback tone to the calling user's communication device for presentation to the calling user. In this manner, the calling user will be notified of the first user's current demeanor. The calling user can take this into consideration when speaking with the first user and structure his/her communication to the first user accordingly.

In addition to, or in lieu of, communicating the ringback tone to the calling user's communication device, responsive to detecting the call being initiated, the processing system can automatically select a visual indicator indicating the current demeanor of the first user, automatically select an image indicating the current demeanor of the first user and/or automatically select a multimedia file indicating the current demeanor of the first user. The processing system can communicate the visual indicator, the image and/or multimedia file to the calling user's communication device for presentation to the calling user.

Several definitions that apply throughout this document now will be presented.

As defined herein, the term "call" means a connection over a communication network between a calling party and a called party via which the calling party and the called party may communicate.

As defined herein, the term "ringback tone" means audio presented by a calling communication device to a user responsive to the user initiating a call, but prior to the called party answering the call. A ringback tone is presented to the user in lieu of a standard ringing sound.

As defined herein, the term "user expression" means one or more utterances spoken by a user, one or more motions or positions of an appendage or eyes of a user and/or one or more motions or positions of a user's muscles beneath the skin of the user. A user expression can be, for example, an utterance spoken by a user during conversation being held using a communication device, a facial gesture, eye movement, arm movement, movement of the user's body and the like. A "user expression," as defined herein, is not a user gesture or spoken utterance selecting an element of a user interface (e.g., an icon, file, menu item or the like).

As defined herein, the term "text-based electronic communication" means an electronic mail (e-mail), a text message, an instant message, text electronically posted to a social networking website and/or text electronically posted to a web-based forum.

As defined herein, the term "background sound" means a sound detectable by a user's communication device that is not specifically intended to be directed the communication device. Examples of background sound include, for example, audio noise in an environment, a conversation taking place among two or more people in an environment, and the like.

As defined herein, the term "current demeanor" means a present emotional state exhibited by a user.

As defined herein, the term "communication device" means a device or processing system used by a user to participate in a voice and/or video call. Examples of a communication device include, but are not limited to, a telephone, a VoIP telephone, a smart phone, a personal digital assistant (PDA), a desktop computer, a workstation, a tablet computer, a laptop computer, a netbook computer, a mobile computer, and the like. In this regard, a communication device may include a processor and memory, but this need not be the case.

As defined herein, the term "processing system" means a system including at least one processor and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "communication network" means a medium used to provide communications links between various communication devices and processing systems within a communication system. A communication network includes at least one device or system including at least one processor and memory configured to manage communication traffic. A communication network may include connections, such as wire, wireless communication links and/or fiber optic cables. A communication network can be implemented as, or include, any of a variety of different communication technologies such as a wide area network (WAN), a local area network (LAN), a wireless network, a mobile network, a Virtual Private Network (VPN), the Internet, a Public Switched Telephone Network (PSTN), or the like.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or the like.

As defined herein, the term "automatically" means without user intervention.

As defined herein, the term "user" means a person (i.e., a human being).

Figure 1:
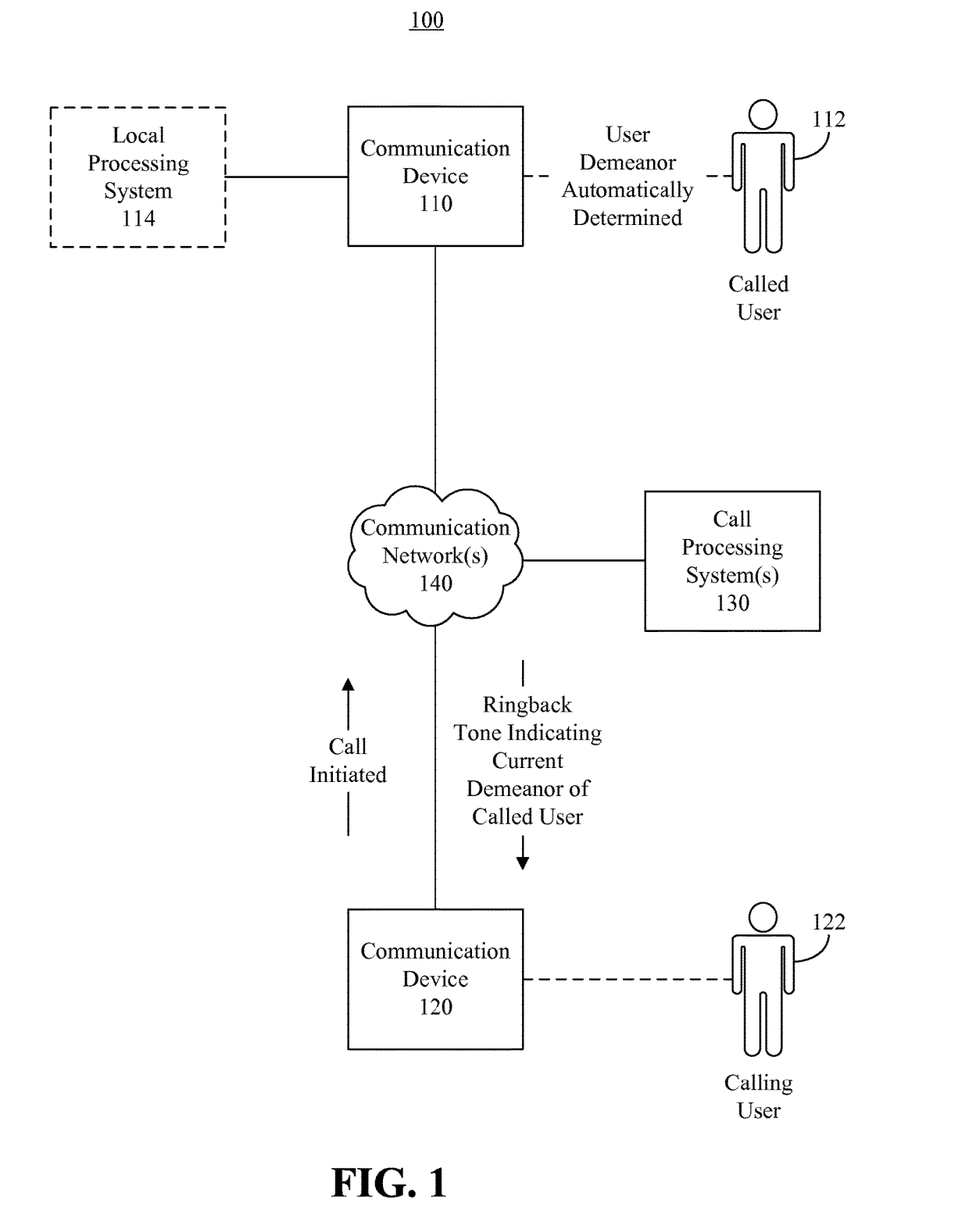
FIG. 1 is a block diagram illustrating an example of a communication system in which a ringback tone indicating a current demeanor of a called user is generated and communicated to a calling communication device.

FIG. 1 is a block diagram illustrating an example of a communication system 100 in which a ringback tone indicating a current demeanor of a called user is generated and communicated to a calling communication device. The communication system 100 can include a communication device 110, a communication device 120, and at least one call processing system 130. The communication device 110, communication device 120 and call processing system(s) 130 can be communicatively linked to one or more communication networks 140. The call processing system 130 can be a component of a PSTN, a component of a private branch exchange (PBX) phone system, a component of a mobile network, or the like.

In operation, the communication device 110, or a processing system to which the communication device 110 is communicatively linked (e.g., the call processing system 130 or a local processing system 114), can monitor user expressions of the user 112. For example, in an arrangement in which communication device 110 includes at least one processor and memory (e.g., an arrangement in which the communication device 110 is a VoIP telephone, a smart phone, a PDA, a desktop computer, a workstation, a tablet computer, a laptop computer, a netbook computer, a mobile computer, or the like), the communication device can monitor utterances spoken by the user 112 using an input audio transducer. Such utterances can be spoken by the user while the user is on a call using the communication device 110 and/or utterances spoken by the user that are otherwise detected by the communication device. In an arrangement in which the user is on a call with another person, spoken utterances of that other person can be received by the communication device 110 via the communication network(s) 140, and such spoken utterances can be processed, in addition to utterances spoken by the user 112, to determine contextual information about the conversation, which can infer a demeanor of the user.

The communication device 110 can apply speech recognition to the detected spoken utterances to generate text or other data corresponding to the spoken utterances. The communication device 110 also can use natural language processing (NLP), semantic analysis and sentiment analysis to determine a demeanor exhibited by the user in the spoken utterances. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. Sentiment analysis is the use of NLP, text analysis and computation linguistics to identify and extract subjective information in source information. In general, sentiment analysis determines the attitude of a user when speaking and/or writing, and indicate the demeanor of the user. NLP, semantic analysis and sentiment analysis are known to those skilled in the art.

The demeanor exhibited by the user in the spoken utterances can be determined based on words communicated by the spoken utterances, the audible volume of the spoken utterances, voice inflections used in the spoken utterances, the pace at which the spoken utterances are delivered by the user 112, etc. For example, if the spoken utterances of the user 112 indicate words of sadness, the current demeanor of the user 112 can be determined to be sad, if the spoken utterances of the user 112 indicate words of joy, the current demeanor of the user 112 can be determined to be happy, if the spoken utterances of the user 112 indicate frustration, the current demeanor of the user 112 can be determined to be frustrated. If the utterances are spoken loudly and sternly by the user 112, the current demeanor of the user 112 can be determined to be angry. In another example, if the spoken utterances of another person speaking to the user 112 indicate that person is angry, and the user 112 responds with words of regret, the current demeanor of the user 112 can be determined to be sorry or apologetic. Still, NLP, semantic analysis and sentiment analysis can be applied to determine any other current demeanor of the user and the present arrangements are not limited to these examples.

The communication device 110 also can monitor background sound in the physical environment in which the user 112 and/or communication device 110 are located in order to determine a current demeanor of the user 112. For example, based on the background sound, the communication device 110 can determine a level of emotional stress of people in the physical environment. In illustration, if the background sound indicates that people in the physical environment are yelling, screaming or speaking sternly, the communication device 110 can determine that there is a high level of emotional stress exhibited by people in the physical environment, which can be interpreted to infer that the current demeanor of the user is emotionally stressed. On the other hand, if the background sound indicates that people are speaking calmly to one another, the communication device 110 can determine that there is a low level of emotional stress exhibited by people in the physical environment, which can be interpreted to infer that the current demeanor of the user is calmness. Again, NLP, semantic analysis and sentiment analysis can be applied to any spoken utterances detected as background sound, and the language used in the speech also can be processed to determine a level of emotional stress in the physical environment.

In an arrangement in which the communication device 110 does not include a processor and memory, for example if the communication device 110 is a conventional telephone, the spoken utterances and background sound can be monitored by the local processing system 114 or the call processing system 130 to determine the demeanor of the user. Moreover, if the communication device 110 does include a processor and memory, but is not specifically configured to monitor the spoken utterances and background sound, the spoken utterances and background sound can be monitored by the local processing system 114 and/or the call processing system 130 to determine the current demeanor of the user.

In an arrangement in which the communication device 110 further includes, or is otherwise communicatively linked to, an image capture device (e.g., camera), the communication device 110 also can monitor visible user expressions of the user 112 in order to determine the current demeanor of the user 112. For example, the image capture device can capture images of the user and the communication device 110 can process such images to identify the visible user expressions. In illustration, the communication device 110 can monitor facial expressions of the user 112, movement of the user's body and/or appendages, etc., and determine the current demeanor of the user 112 from such visible user expressions. In illustration, if the user is frowning and/or crying, this can indicate that the current demeanor of the user is sad. If the user is smiling, this can indicate that the current demeanor of the user is happy. If the user is pacing back and forth, this can indicate that that the current demeanor of the user is concern or distraction.

In an arrangement in which the communication device 110 does not include, and is not communicatively linked to, an image capture device, but the local processing system 114 includes, or is commutatively linked to, an image capture device in the environment in which the user is located, such visible user expressions can be monitored and processed by the local processing system 114. The visible user expressions can be processed by the local processing system and/or the call processing system 130 to determine the current demeanor of the user 112 in a manner similar to that described above.

Text-based electronic communications sent or received by the user 112 also can be monitored by the communication device 110 or the local processing system 114 in order to determine the current demeanor of the user 112. For example, in an arrangement in which the communication device 110 is a smart phone, a PDA, a desktop computer, a workstation, a tablet computer, a laptop computer, a netbook computer, a mobile computer, or the like, the communication device 110 can monitor e-mails, text messages, instant messages, sent and/or received by the user 112, as well as posts made by the user 112 to one or more social networking sites and/or web-based forums and/or posts made by other users that are directed to the user 112. In illustration, as each new text-based electronic communication is sent by the user 112 and/or posted by the user 112, the communication device 110 can use NLP, semantic analysis and sentiment analysis to analyze text contained in the text-based electronic communication in order to determine a current demeanor exhibited by the user in the text-based electronic communication.

Similarly, as each received text-based electronic communication is accessed by the user 112, the communication device 110 can use NLP, semantic analysis and sentiment analysis to analyze text contained in the text-based electronic communication to determine a sentiment expressed in the received electronic communication. The sentiment expressed in the text-based electronic communication can infer a current demeanor of the user 112. For example, if the user accesses a text-based electronic communication which is presented in a sentiment reflecting happiness, the current demeanor of the user 112 can be inferred to be happy. If the user accesses a text-based electronic communication which is presented in a sentiment reflecting anger toward the user 112, the current demeanor of the user 112 can be inferred to be angry or apologetic.

In an arrangement in which the communication device 110 is not used to send and/or receive text-based electronic communications, for example if the communication device 110 is a VoIP telephone or a conventional telephone, but the local processing system 114 is used by the user to send and receive text-based communications, the local processing system 114 and/or the call processing system 130 can monitor the text-based electronic communications to determine the current demeanor of the user 112 in a manner similar to that described above.

At this point it should be noted that the current demeanor of the user 112 can be determined based on one or more of the modes discussed above. For example, spoken utterances of the user 112, spoken utterances of other people with whom the user 112 is conversing, background sounds, visible user expressions of the user 112 and text-based communications sent and/or received by the user 112 can be monitored, and the current demeanor of the user 112 can be determined based on one of these modes, or a combination of two or more of these modes. Moreover, the current demeanor of the user 112 can be continually updated, in real time, as additional information is gleaned from the various modes.

In illustration, the user's demeanor may change based on various circumstances, and as the user's demeanor changes, so too will the automatic determination of the current demeanor of the user 112. For example, the user 112 may exhibit a stressed demeanor while speaking with co-workers, but may receive a call from a loved one that causes the user's demeanor to change to cheerful. The automatically determined current demeanor of the user 112 can change accordingly.

For example, an initial weight having a first value can be initially assigned to data gathered from spoken utterances of the user 112, spoken utterances of other people with whom the user 112 is conversing, background sounds, visible user expressions of the user 112 and/or text-based communications sent and/or received by the user 112 when the information is initially gathered. The value of the weight, however, can be adjusted lower as time passes. For example, the weight value can continually be adjusted lower until it reaches a threshold value, or be adjusted lower every so often, for example every second, every five seconds, every ten seconds, every thirty seconds, every minute, every five minutes, every ten minutes, every fifteen minutes, every thirty minutes, every hour, etc. Accordingly, the present weight value assigned to the gathered data can be based on how recently the data was received. In this regard, the most recent data gathered based on spoken utterances of the user 112, spoken utterances of other people with whom the user 112 is conversing, background sounds, visible user expressions of the user 112 and/or text-based communications sent and/or received by the user 112 can be given a greater weight than earlier gathered data when determining the current demeanor of the user 112. The weight values assigned to various gathered data can be processed by the communication device 110, local processing system 114 and/or call processing system 130, along with the gathered data, to determine the user's current demeanor.

Further, in one non-limiting arrangement, the user 112 also can provide a self-assessment of his/her current demeanor. For example, a user interface can be presented on a display of the communication device 110 or the local processing system 114. The user interface can present to the user a menu from which the user 112 can select a demeanor from a list of demeanors to indicate the user's current demeanor. In another arrangement, the user 112 can select a demeanor by selecting a button or key of the communication device 110 which has been assigned to correspond to a particular demeanor. In one aspect, the user 112 also can select a period of time, for example via the menu, for which the selected demeanor is to be used to determine the user's current demeanor. Responsive to that period expiring, or the user selecting another demeanor from the list, the initially selected demeanor can expire and no longer be used to determine the user's demeanor. Further, a weight can be assigned to the user selected demeanor based on the amount of time that has passed since the demeanor was selected by the user. Again, the weight initially can be high, but the communication device 110, local processing system 114 and/or call processing system can decrease the weight as time passes.

For example, if the user has selected the demeanor within the last hour, the user selected demeanor can be assigned a higher weight than if the user selected the demeanor more than one hour ago. In this regard, one or more of the above described modes for determining the current demeanor of the user 112 still can be processed to monitor the user's demeanor and assigned one or more corresponding weights. The communication device 110, local processing system 114 and/or call processing system 130 can process each of the assigned weights to determine a current demeanor of the user 112. Thus, if the user's demeanor changes after the user selects a demeanor from the menu, the current demeanor of the user can be updated based on such circumstance. Moreover, if the user 112 forgets to update his/her demeanor in the menu, the processes described herein still can ensure that the user's actual demeanor at a given time is determined as being the user's current demeanor.

The determined current demeanor of the user 112 can be processed by the communication device 110, local processing system 114 and/or call processing system 130 to automatically select a ringback tone to be communicated to one or more other communication devices, for example the communication device 120, responsive to a call being received from the communication device(s). In illustration, a user (calling user) 122 can, using the communication device 120, initiate a call to a user (called user) 112. Responsive to detecting the incoming call, the communication device 110, local processing system 114 and/or call processing system 130 can identify the determined current demeanor of the user. Based at least on the determined current demeanor of the user 112, the communication device 110, local processing system 114 and/or call processing system 130 can select a ringback tone corresponding to, and thus indicating, the current demeanor.

By way of example, the communication device 110, local processing system 114 and/or call processing system 130 can access a data structure, for example a data table, that correlates each of a plurality of various demeanors to a particular ringback tone. In one arrangement, a default ringback tone can be assigned to each demeanor. In another arrangement, the communication device 110, local processing system 114 and/or call processing system 130 can present, via a display, to the user a menu including a list of demeanors and a list of ringback tones. Using the menu, the user 112 can assign a ringback tone to correspond to each demeanor listed in the menu.

Responsive to selecting the ringback tone in response to detecting the incoming call from the communication device 120, the communication device 110, local processing system 114 and/or call processing system 130 can communicate to the communication device 120 the selected ringback tone. The ringback tone can be communicated to the communication device 120 until the user 112 answers the incoming call. The communication device 120 can present the ringback tone to the user 112 via an audio output transducer of the communication device 120 so that the user 122 will hear the ringback tone. The ringback tone can indicate to the user 122 the current demeanor of the user 112. Accordingly, the user 122 can take the current demeanor into consideration when speaking with user 112 and structure his/her communication to the user 112 accordingly.

In addition to, or in lieu of, selecting the ringback tone indicating the current demeanor of the user, responsive to detecting the incoming call, the communication device 110, local processing system 114 and/or call processing system 130 can select a visual indicator, an image and/or a media file indicating the current demeanor of the user. To select the visual indicator, image and/or media file, the communication device 110, local processing system 114 and/or call processing system 130 can access a data structure that correlates each of a plurality of various demeanors to a particular visual indicator, image and/or media file. Again, a default visual indicator, image and/or media file can be assigned to each demeanor, or the user 112 can assign a visual indicator, image and/or media file to each demeanor. Moreover, the user 112 can upload to the communication device 110, local processing system 114 and/or call processing system 130 various images and/or media files, and assign such images and/or media files to respective demeanors.

A visual indicator can be, for example, a color to be presented on the communication device 120 of the calling user 122. For example, the communication device 110, local processing system 114 and/or call processing system 130 can communicate to the communication device 120 data corresponding to a particular color which indicates the current demeanor of the user 112, and the communication device 120 can be configured to change a foreground and/or background color on the display of the communication device 120 responsive to receiving the data. In another example, the visual indicator can be an icon, emoticon, emoji, or the like, and the communication device 110, local processing system 114 and/or call processing system 130 can communicate data corresponding to the icon, emoticon, emoji, or the like, to the communication device 120 responsive to detecting the incoming call. The communication device 120 can be configured to, responsive to receiving the data, present the corresponding icon, emoticon, emoji, or the like, on the display of the communication device 120. Accordingly, the user 122 can take the current demeanor into consideration when speaking with user 112 and structure his/her communication to the user 112 accordingly.

An image can be, for example, a picture, drawing, illustration or the like, and the communication device 110, local processing system 114 and/or call processing system 130 can communicate data corresponding to the image to the communication device 120 responsive to detecting the incoming call. The communication device 120 can be configured to, responsive to receiving the image, present the image on the display of the communication device 120, for example over at least a portion of a view presented on the display. The media file can be, for example, a video clip which may, but need not, also include audio. The communication device 110, local processing system 114 and/or call processing system 130 can communicate data corresponding to the media file to the communication device 120 responsive to detecting the incoming call. The communication device 120 can be configured to, responsive to receiving the media file, present the media contained in the media file on the display of the communication device 120, for example over at least a portion of a view presented on the display. Based on the presented image and/or media, the user 122 can take the current demeanor into consideration when speaking with user 112 and structure his/her communication to the user 112 accordingly.

In one aspect of the present arrangements, the user 112 can choose other users to whom the ringback tone, visual indicator, image and/or a media file indicating the current demeanor of the user is to be communicated. For example, the user 112 can select one or more particular users, or one or more groups of users, from a contact list of the user 112. In illustration, communication device 110, local processing system 114 and/or call processing system 130 can present a user interface on a display of the communication device 110 or the local processing system 114. Via the user interface, the user can select the other user(s), or group(s) of users, and indicate that the ringback tone, visual indicator, image and/or a media file is to be communicated to the communication device(s) of such other user(s) in response to such other user(s) initiating a call to the user 112.

To determine whether a calling user (e.g. the user 122) is a user to whom the ringback tone, visual indicator, image and/or a media file is to be communicated (e.g., to the communication device 120), the communication device 110, local processing system 114 and/or call processing system 130 can identify a caller identifier (e.g., user identifier, telephone number, IP address, etc.) associated with the incoming call. Based on the caller identifier, the communication device 110, local processing system 114 and/or call processing system 130 can identify the user 122 and determine whether the user 122 has been designated to receive the ringback tone, visual indicator, image and/or a media file. If so, the communication device 110, local processing system 114 and/or call processing system 130 can select and communicate the ringback tone, visual indicator, image and/or a media file to the communication device 120 for presentation to the user 122 responsive to the incoming call being detected. If not, a conventional ring tone can be communicated to the communication device 120 for presentation to the user 122.

In a further arrangement, the user 112 can, for each demeanor, specify different ringback tones, visual indicators, images and/or a media files, and indicate which ringback tones, visual indicators, images and/or a media files are to be communicated to the different users or group of users. In illustration, for a happy demeanor, a first ringback tone, visual indicator, image and/or a media file can be selected to be communicated to the user's relatives, and a second ringback tone, visual indicator, image and/or a media file can be selected to be communicated to the user's co-workers. In another example, a first ringback tone, visual indicator, image and/or a media file can be selected for communication to the user's co-workers who are in a same level as the user 112 in an organizational hierarchy, a second ringback tone, visual indicator, image and/or a media file can be selected for communication to the user's co-workers who are in a lower level than the user 112 in the organizational hierarchy, and a third ringback tone, visual indicator, image and/or a media file can be selected for communication to the user's co-workers who are in a higher level than the user 112 in the organizational hierarchy. Still, the communication device 110, local processing system 114 and/or call processing system 130 can be configured to allow the user 112 to specify ringback tones, visual indicators, images and/or a media files to be communicated to certain users or groups of users based on the current demeanor of the user 112, and the present arrangements are not limited in this regard.

Figure 2:
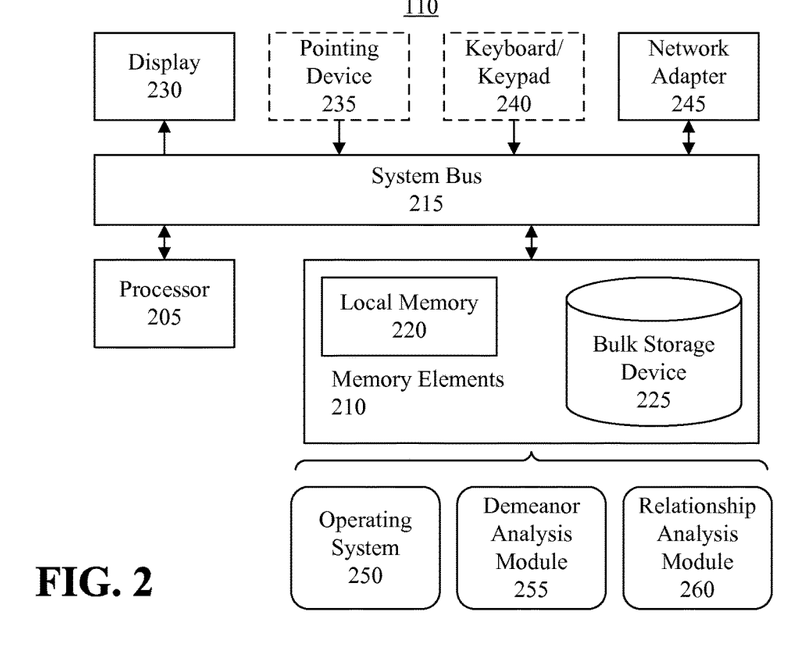
FIG. 2 is a block diagram illustrating example architecture for a communication device.

FIG. 2 is a block diagram illustrating example architecture for the communication device 110. In the example depicted in FIG. 2, the communication device 110 can be configured to perform the process of automatically determining the demeanor of the user, selecting a corresponding ringback tone, visual indicator, image and/or a media file indicating the current demeanor of the user, and communicating the ringback tone, visual indicator, image and/or a media file to another communication device from which an incoming call is placed. In this example, the communication device 110 can be a VoIP telephone, a smart phone, a PDA, a desktop computer, a workstation, a tablet computer, a laptop computer, a netbook computer, a mobile computer, or the like.

The communication device 110 can include at least one processor 205 (e.g., a central processing unit) coupled to memory elements 210 through a system bus 215 or other suitable circuitry. As such, the communication device 110 can store program code within the memory elements 210. The processor 205 can execute the program code accessed from the memory elements 210 via the system bus 215. It should be appreciated that the communication device 110 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The communication device 110 also can include one or more cache memories (not shown) that provide temporary storage of at least some program code in order to reduce the number of times program code must be retrieved from the bulk storage device 225 during execution.

Input/output (I/O) devices such as a display 230 and, optionally a pointing device 235 and a keyboard 240 can be coupled to the communication device 110. In one arrangement, the display 230 can be a touchscreen. The I/O devices can be coupled to the communication device 110 either directly or through intervening I/O controllers. For example, the display 230 can be coupled to the communication device 110 via a graphics processing unit (GPU), which may be a component of the processor 205 or a discrete device. One or more network adapters 245 also can be coupled to communication device 110 to enable the communication device 110 to become coupled to other communication devices, systems, computer systems, remote printers, and/or remote storage devices through intervening private or public networks. Modems, cable modems, transceivers, and Ethernet cards are examples of different types of network adapters 245 that can be used with the communication device 110.

As pictured in FIG. 2, the memory elements 210 can store the components of the communication device 110, namely an operating system 250, a demeanor analysis module 255 and a relationship analysis module 260. Being implemented in the form of executable program code, these components of the communication device 110 can be executed by the communication device 110 (e.g., using the processor 205 and memory elements 210) and, as such, can be considered part of the communication device 110. Moreover, the operating system 250, demeanor analysis module 255 and relationship analysis module 260 are functional data structures that impart functionality when employed as part of the communication device 110 of FIG. 2. The operating system 250 can be implemented as well known in the art. The demeanor analysis module 255 and relationship analysis module 260 can be configured to perform the processes described in FIGS. 4 and 5.

Figure 3:
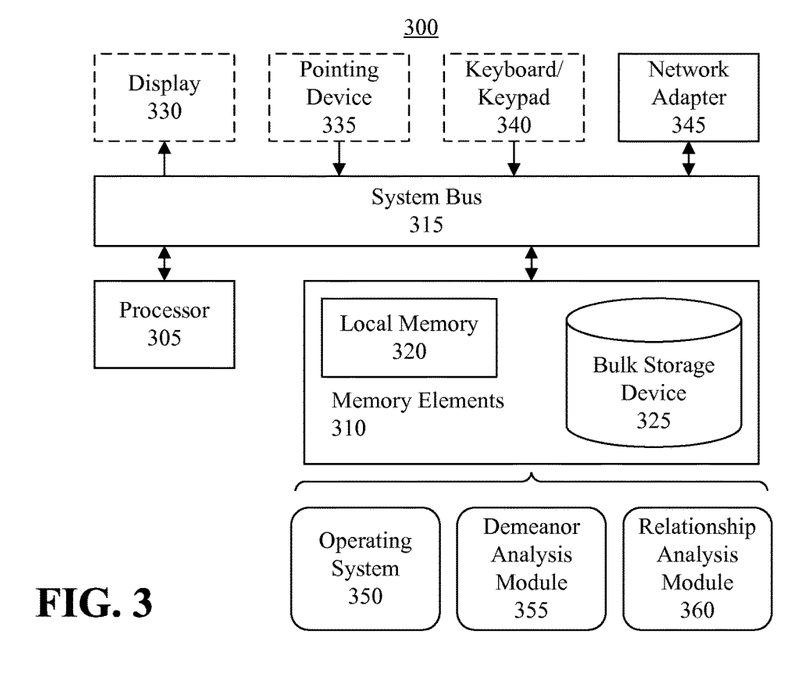
FIG. 3 is a block diagram illustrating example architecture for a processing system.

FIG. 3 is a block diagram illustrating example architecture for a data processing system 300. In this example, the data processing system 300 can be used as the local processing system 114 or the call processing system 130 of FIG. 1 in an arrangement in which the local processing system 114 or the call processing system 130 performs the process of automatically determining the demeanor of the user, selecting a corresponding ringback tone, visual indicator, image and/or a media file indicating the current demeanor of the user, and communicating the ringback tone, visual indicator, image and/or a media file to another communication device from which an incoming call is placed. The data processing system 300 also can perform various other functions known in the art.

The data processing system 300 can include at least one processor 305 coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a computer, a server, a mainframe or another suitable processing system.

The memory elements 310 can include one or more physical memory devices such as, for example, local memory 320 and one or more bulk storage devices 325. The data processing system 300 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and a keyboard 340 optionally can be coupled to the data processing system 300. The I/O devices can be coupled to the data processing system 300 either directly or through intervening I/O controllers. One or more network adapters 345 also can be coupled to data processing system 300 to enable the data processing system 300 to become coupled to communication devices, systems, computer systems, remote printers, and/or remote storage devices through intervening private or public networks. Modems, cable modems, transceivers, and Ethernet cards are examples of different types of network adapters 345 that can be used with the data processing system 300. Optionally, the data processing system 300 can include one or more communication ports via which a communication device (e.g., a conventional telephone) may be directly linked to the data processing system 300, for example using an RJ-11, RJ-12 or RJ-45 connector.

As pictured in FIG. 3, the memory elements 310 can store the components of the data processing system 300, namely an operating system 350, a demeanor analysis module 355 and a relationship analysis module 360. Being implemented in the form of executable program code, these components of the data processing system 300 can be executed by the data processing system 300 (e.g., using the processor 305 and memory elements 310) and, as such, can be considered part of the data processing system 300. Moreover, the operating system 350, demeanor analysis module 355 and relationship analysis module 360 are functional data structures that impart functionality when employed as part of the data processing system 300 of FIG. 3. The operating system 350 can be implemented as well known in the art. The demeanor analysis module 355 and relationship analysis module 360 can be configured to perform the processes described in FIGS. 4 and 5.

Figure 4:
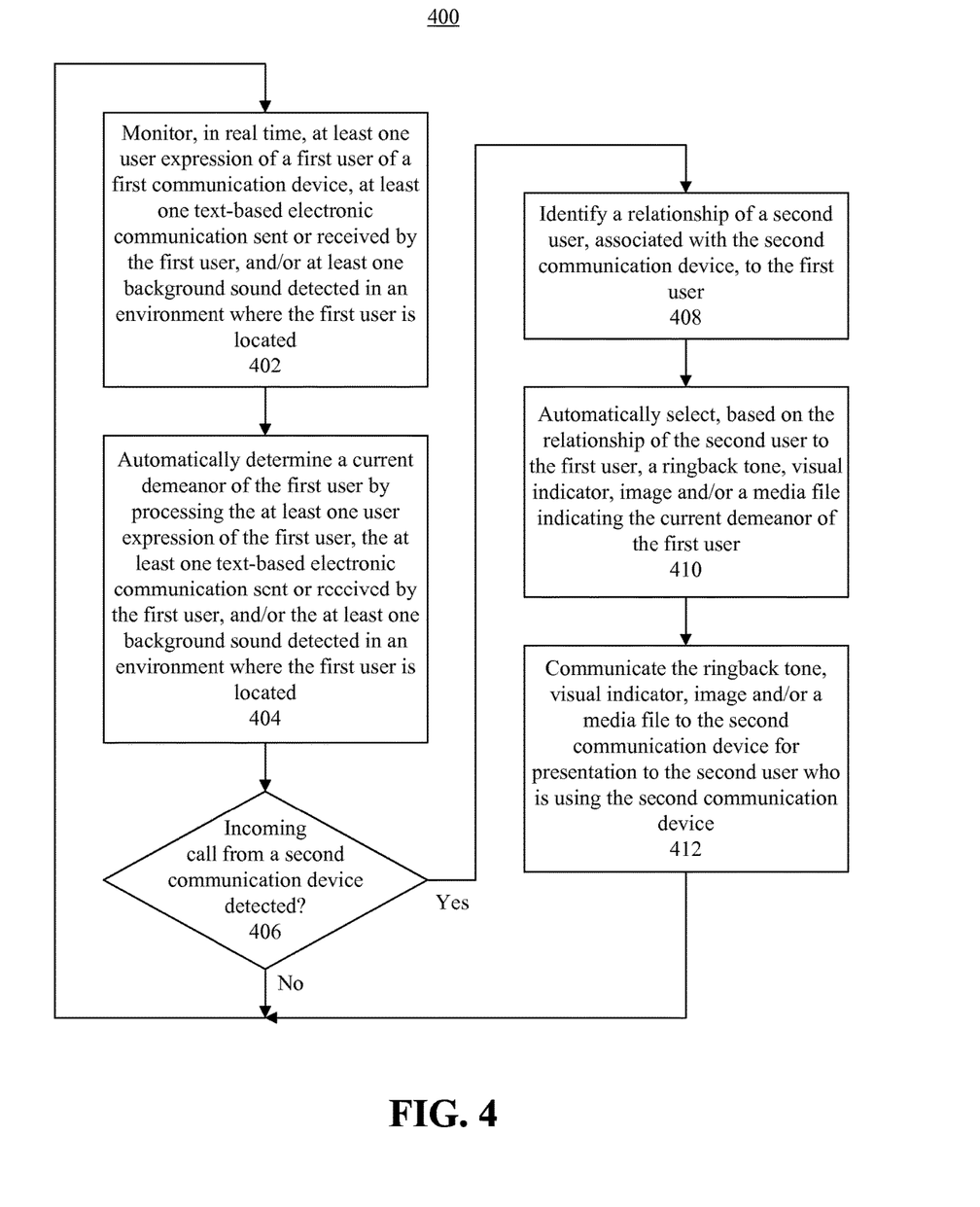
FIG. 4 is a flow chart illustrating an example of a method of selecting a ringback tone indicating a current demeanor of a called user and communicating the ringback tone to a calling communication device.

FIG. 4 is a flow chart illustrating an example of a method 400 of selecting a ringback tone indicating a current demeanor of a called user and communicating the ringback tone to a calling communication device. The method 400 can be implemented by the demeanor analysis module 255 of FIG. 2 or the demeanor analysis module 355 of FIG. 3.

At step 402, at least one user expression of a first user of a first communication device, at least one text-based electronic communication sent or received by the first user, and/or at least one background sound detected in an environment where the first user is located can be monitored in real time. These modes can be monitored as previously described. At step 404, a current demeanor of the first user can be automatically determined by processing the at least one user expression of the first user, the at least one text-based electronic communication sent or received by the first user, and/or the at least one background sound detected in an environment where the first user is located. The current demeanor of the first user can be determined as previously described.

Referring to decision box 406, while no incoming calls are detected, the process can return to step 402 and proceed to step 404. In this regard, the user expressions of the first user, text-based electronic communications and/or detected backgrounds can be continually monitored and the current demeanor of the first user can be updated as circumstances change. Referring again to decision box 406, if an incoming call from a second communication device is detected, the process can proceed to step 408. At step 408, a relationship of a second user, associated with the second communication device, to the first user can be identified, for example as described in FIG. 5. In illustration, the relationship analysis module 260, 360 can identify the relationship and communicate corresponding data to the demeanor analysis module 255, 355.

At step 410, a ringback tone, visual indicator, image and/or a media file indicating the current demeanor of the first user can be automatically selected, for example based on the relationship of the second user to the first user. At step 412, the ringback tone, visual indicator, image and/or a media file indicating the current demeanor of the first user can be communicated to the second communication device for presentation to the second user who is using the second communication device. The process then can return to step 402 and continue.

Figure 5:
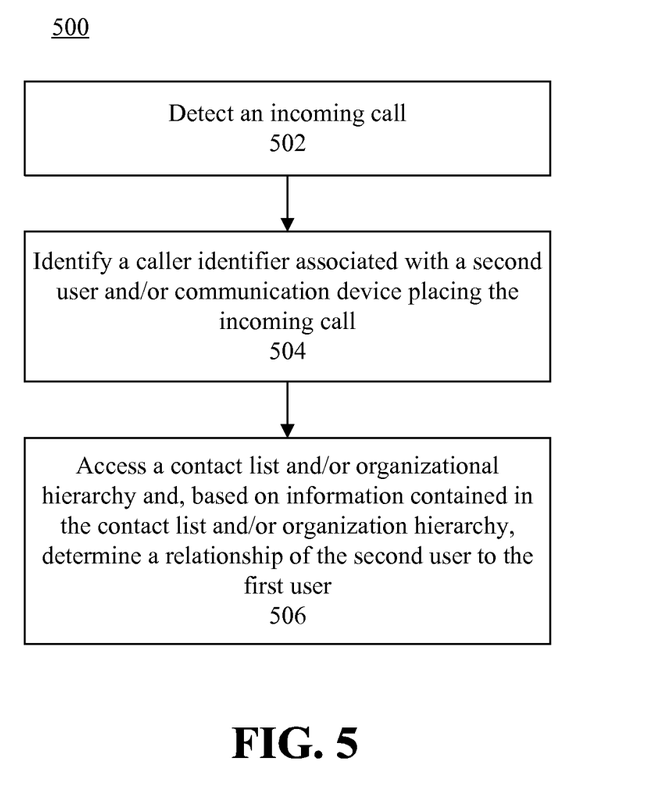
FIG. 5 is a flow chart illustrating an example of a method of identifying a relationship between a calling user and a called user.

FIG. 5 is a flow chart illustrating an example of a method 500 of identifying a relationship between a calling user and a called user. The method 500 can be implemented by the relationship analysis module 260 of FIG. 2 or the relationship analysis module 360 of FIG. 3.

At step 502, an incoming call can be detected. At step 504, a caller identifier associated with a second user and/or communication device placing the incoming call can be identified. For example, a user identifier, telephone number, IP address, or the like can be received as data accompanying the incoming call, as is well known in the art.

At step 506, a contact list and/or organizational hierarchy can be accessed, and the caller identifier can be processed to identify the second user in the contact list and/or organizational hierarchy. Further, information contained in the contact list and/or organizational hierarchy that corresponds to the second user can be processed to determine a relationship of the second user to the first user. For example, the contact list can indicate whether the second user belongs to a particular group of contacts, for example a family group, a friend group, a co-worker group, etc. Moreover, if the second user belongs to a co-worker group, information corresponding to the first user and the second user in the organizational hierarchy can be processed to determine whether the second user is at the same level as the first user in the hierarchy, or whether the second user is at a lower or higher level than the first user in the organizational hierarchy. Also, based on the organizational hierarchy, a determination can be made as to whether the second user is in a same department or working group as the first user. Still, the relationship of the second user to the first user can be determined in any other suitable manner and the present arrangements are not limited in this regard.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
monitoring, in real time, at least one user expression of a first user of a first communication device, at least one text-based electronic communication sent or received by the first user, or at least one background sound detected in an environment where the first user is located;
automatically determining a current demeanor of the first user by processing, using a processor, the at least one user expression of the first user, the at least one text-based electronic communication sent or received by the first user, or the at least one background sound in the environment where the first user is located;
detecting an incoming call from a second communication device to the first communication device;
responsive to detecting the incoming call from the second communication device to the first communication device:
   identifying a second user associated with the second communication device and determining a relationship of the second user to the first user based on a group of contacts to which the second user is assigned;
   based on the relationship of the second user to the first user, automatically selecting, from a plurality of ringback tones corresponding to the current demeanor of the first user, wherein a first of the plurality of ringback tones is assigned to a family group of contacts and a second of the plurality of ringback tones is assigned to a co-worker group of contacts, a ringback tone indicating the current demeanor of the first user and being indicated to be communicated to the group of contacts to which the second user is assigned; and
   communicating the selected ringback tone indicating the current demeanor of the first user to the second communication device for presentation to a second user who is using the second communication device.

2. The method of claim 1, further comprising:
responsive to detecting the call from the second communication device to the first communication device being initiated, automatically selecting a visual indicator indicating the current demeanor of the first user, and communicating the visual indicator to the second communication device for presentation to the second user of the second communication device.

3. The method of claim 1, further comprising:
responsive to detecting the call from the second communication device to the first communication device being initiated, automatically selecting an image indicating the current demeanor of the first user, and communicating the image to the second communication device for presentation to the second user of the second communication device.

4. The method of claim 1, further comprising:
responsive to detecting the call from the second communication device to the first communication device being initiated, automatically selecting a multimedia file indicating the current demeanor of the first user, and communicating the multimedia file to the second communication device for presentation to the second user of the second communication device.

5. The method of claim 1, further comprising:
assigning a weight to data gathered from the at least one user expression of the first user, the at least one text-based electronic communication sent or received by the first user, or the at least one background sound detected in the environment where the first user is located, the weight having a first value when initially assigned; and adjusting the value of the weight lower as time passes;

wherein automatically determining a current demeanor of the first user further comprises processing the weight assigned to the information gathered from the at least one user expression of the first user, the at least one text-based electronic communication sent or received by the first user, or the at least one background sound detected in the environment where the first user is located.

6. A system, comprising:

a processor programmed to initiate executable operations comprising:

monitoring, in real time, at least one user expression of a first user of a first communication device, at least one text-based electronic communication sent or received by the first user, or at least one background sound detected in an environment where the first user is located;

automatically determining a current demeanor of the first user by processing the at least one user expression of the first user, the at least one text-based electronic communication sent or received by the first user, or the at least one background sound in the environment where the first user is located;

detecting an incoming call from a second communication device to the first communication device;

responsive to detecting the incoming call from the second communication device to the first communication device:

identifying a second user associated with the second communication device and determining a relationship of the second user to the first user based on a group of contacts to which the second user is assigned;

based on the relationship of the second user to the first user, automatically selecting, from a plurality of ringback tones corresponding to the current demeanor of the first user, wherein a first of the plurality of ringback tones is assigned to a family group of contacts and a second of the plurality of ringback tones is assigned to a co-worker group of contacts, a ringback tone indicating the current demeanor of the first user and being indicated to be communicated to the group of contacts to which the second user is assigned; and communicating the selected ringback tone indicating the current demeanor of the first user to the second communication device for presentation to a second user who is using the second communication device.

7. The system of claim 6, the executable operations further comprising:

responsive to detecting the call from the second communication device to the first communication device being initiated, automatically selecting a visual indicator indicating the current demeanor of the first user, and communicating the visual indicator to the second communication device for presentation to the second user of the second communication device.

8. The system of claim 6, the executable operations further comprising:

responsive to detecting the call from the second communication device to the first communication device being initiated, automatically selecting an image indicating the current demeanor of the first user, and communicating the image to the second communication device for presentation to the second user of the second communication device.

9. The system of claim 6, the executable operations further comprising:

responsive to detecting the call from the second communication device to the first communication device being initiated, automatically selecting a multimedia file indicating the current demeanor of the first user, and communicating the multimedia file to the second communication device for presentation to the second user of the second communication device.

10. The system of claim 6, the executable operations further comprising:

assigning a weight to data gathered from the at least one user expression of the first user, the at least one text-based electronic communication sent or received by the first user, or the at least one background sound detected in the environment where the first user is located, the weight having a first value when initially assigned; and adjusting the value of the weight lower as time passes;

wherein automatically determining a current demeanor of the first user further comprises processing the weight assigned to the information gathered from the at least one user expression of the first user, the at least one text-based electronic communication sent or received by the first user, or the at least one background sound detected in the environment where the first user is located.

11. A computer program product comprising a computer readable storage medium having program code stored thereon, the program code executable by a processor to perform a method comprising:

monitoring, by the processor, in real time, at least one user expression of a first user of a first communication device, at least one text-based electronic communication sent or received by the first user, or at least one background sound detected in an environment where the first user is located;

automatically determining, by the processor, a current demeanor of the first user by processing, using a processor, the at least one user expression of the first user, the at least one text-based electronic communication sent or received by the first user, or the at least one background sound in the environment where the first user is located;

detecting, by the processor, an incoming call from a second communication device to the first communication device;

responsive to detecting the incoming call from the second communication device to the first communication device:

identifying, by the processor, a second user associated with the second communication device and determining a relationship of the second user to the first user based on a group of contacts to which the second user is assigned;

based on the relationship of the second user to the first user, automatically selecting, by the processor, from a plurality of ringback tones corresponding to the current demeanor of the first user, wherein a first of the plurality of ringback tones is assigned to a family group of contacts and a second of the plurality of ringback tones is assigned to a co-worker group of contacts, a ringback tone indicating the current demeanor of the first user and being indicated to be communicated to the group of contacts to which the second user is assigned; and communicating, by the processor, the selected ringback tone indicating the current demeanor of the first user to the second communication device for presentation to a second user who is using the second communication device.

12. The computer program product of claim 11, the method further comprising:

responsive to detecting the call from the second communication device to the first communication device being initiated, automatically selecting a visual indicator indicating the current demeanor of the first user, and communicating the visual indicator to the second communication device for presentation to the second user of the second communication device.

13. The computer program product of claim 11, the method further comprising:

responsive to detecting the call from the second communication device to the first communication device being initiated, automatically selecting an image indicating the current demeanor of the first user, and communicating the image to the second communication device for presentation to the second user of the second communication device.

14. The computer program product of claim 11, the method further comprising:

responsive to detecting the call from the second communication device to the first communication device being initiated, automatically selecting a multimedia file indicating the current demeanor of the first user, and communicating the multimedia file to the second communication device for presentation to the second user of the second communication device.

15. The computer program product of claim 11, the method further comprising:

assigning a weight to data gathered from the at least one user expression of the first user, the at least one text-based electronic communication sent or received by the first user, or the at least one background sound detected in the environment where the first user is located, the weight having a first value when initially assigned; and adjusting the value of the weight lower as time passes;

wherein automatically determining a current demeanor of the first user further comprises processing the weight assigned to the information gathered from the at least one user expression of the first user, the at least one text-based electronic communication sent or received by the first user, or the at least one background sound detected in the environment where the first user is located.

16. The method of claim 1, wherein a third of the plurality of ringback tones is assigned to a friend group of contacts.

17. The system of claim 6, wherein a third of the plurality of ringback tones is assigned to a friend group of contacts.

18. The computer program product of claim 11, wherein a third of the plurality of ringback tones is assigned to a friend group of contacts.

* * * * *